(12) United States Patent
Raszkowski et al.

(10) Patent No.: US 9,719,581 B2
(45) Date of Patent: Aug. 1, 2017

(54) VARIATOR STATOR FUNCTIONAL AND MANUFACTURING IMPROVEMENTS

(71) Applicant: Allison Transmission Inc., Indianapolis, IN (US)

(72) Inventors: James A. Raszkowski, Indianapolis, IN (US); Jeremy Turner, Indianapolis, IN (US); Brian Schoolcraft, Crawfordsville, IN (US); Brad P. Pohl, Leander, TX (US)

(73) Assignee: ALLISON TRANSMISSION, INC., Indianapolis, IN (US)

( * ) Notice: Subject to any disclaimer, the term of this patent is extended or adjusted under 35 U.S.C. 154(b) by 162 days.

(21) Appl. No.: 14/662,838

(22) Filed: Mar. 19, 2015

(65) Prior Publication Data

US 2016/0273626 A1 Sep. 22, 2016

(51) Int. Cl.
*F16H 15/28* (2006.01)
(52) U.S. Cl.
CPC .................................. *F16H 15/28* (2013.01)
(58) Field of Classification Search
CPC ............................................ F16H 2057/02017
See application file for complete search history.

(56) References Cited

U.S. PATENT DOCUMENTS

| | | | |
|---|---|---|---|
| 8,827,856 B1* | 9/2014 | Younggren | F16H 61/6645 475/186 |
| 9,057,439 B2* | 6/2015 | Younggren | F16H 61/664 |
| 2007/0142161 A1* | 6/2007 | Miller | B60K 6/36 476/4 |
| 2010/0267510 A1* | 10/2010 | Nichols | B62M 11/16 475/189 |
| 2011/0172050 A1* | 7/2011 | Nichols | B62M 11/04 475/183 |
| 2013/0095977 A1* | 4/2013 | Smithson | F16H 15/28 476/38 |
| 2014/0274535 A1* | 9/2014 | Hamrin | F16H 61/6649 475/189 |
| 2014/0274551 A1* | 9/2014 | Younggren | F16H 15/52 476/2 |

\* cited by examiner

*Primary Examiner* — Huan Le
*Assistant Examiner* — Lori Wu
(74) *Attorney, Agent, or Firm* — Taft Stettinius & Hollister LLP; Stephen F. Rost

(57) ABSTRACT

A continuously variable planetary (CVP) transmission, comprising a movable stator radially disposed about an axis, the movable stator having at least a first slot. The CVP transmission having a clip removably coupled to the first slot where the clip defining a channel and a planet spindle defining a first end where the first end is disposed within the channel of the clip.

20 Claims, 8 Drawing Sheets

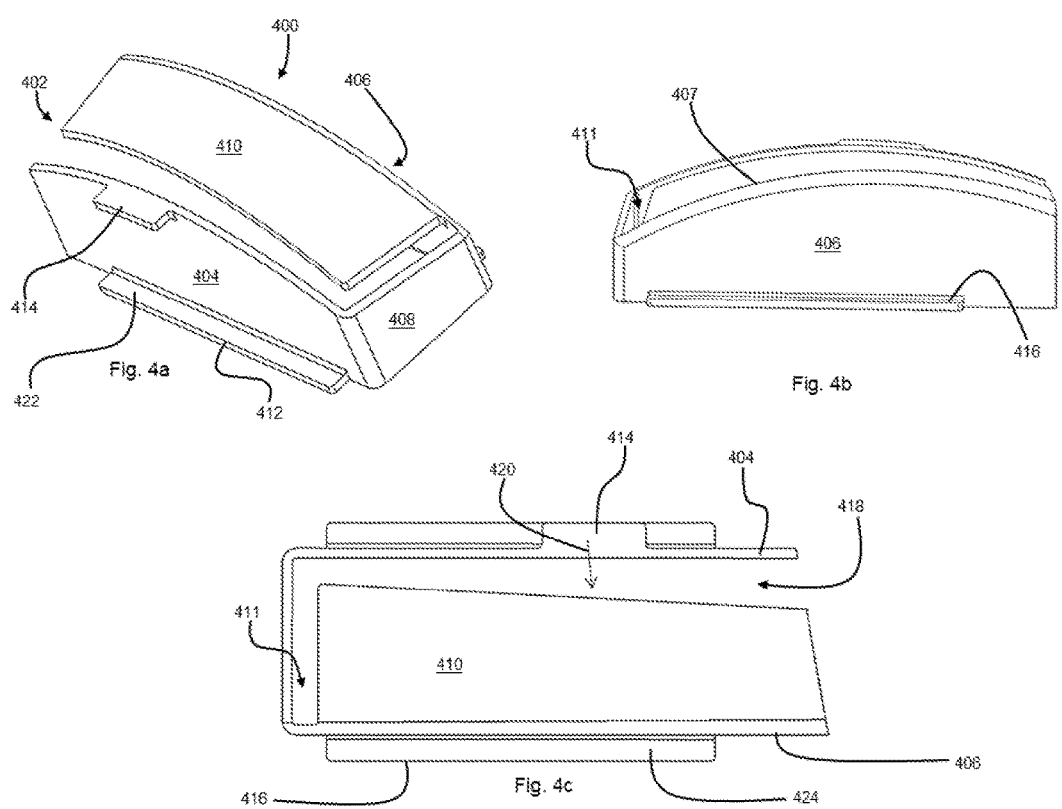

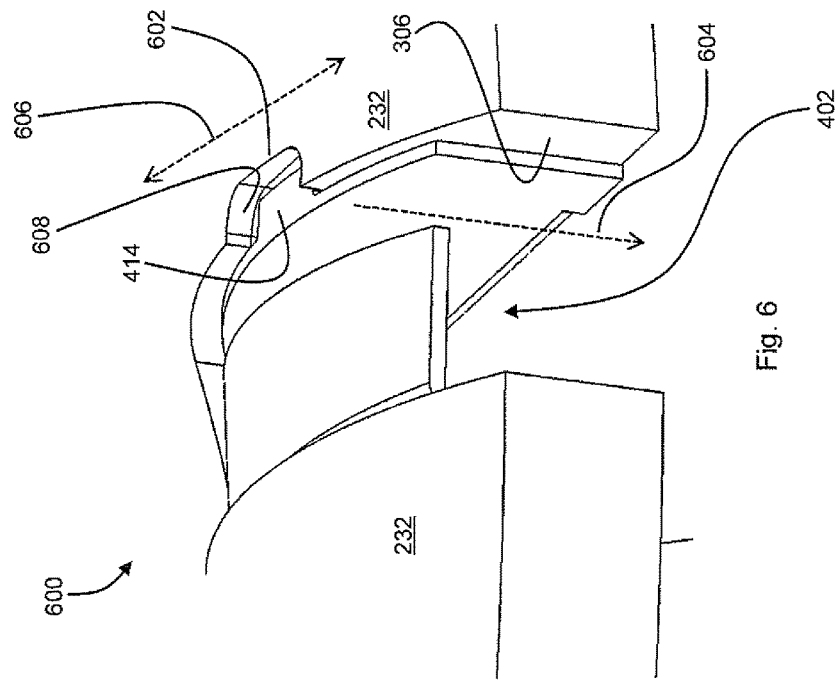
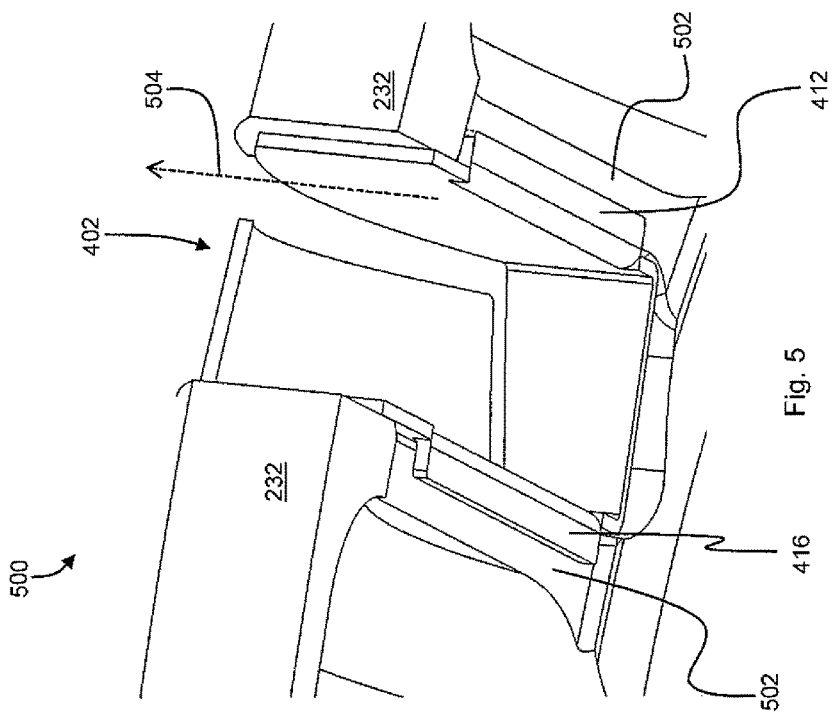

VARIATOR STATOR FUNCTIONAL AND MANUFACTURING IMPROVEMENTS

FIELD OF THE DISCLOSURE

The present disclosure relates to a continuously variable transmission, and in particular to a stator assembly of the continuously variable transmission.

BACKGROUND

In a vehicle, a prime mover drives a set of wheels, or other ground engaging traction devices, which engages a support surface, such as a road or ground, to move the vehicle. Because the output of the prime mover, which includes engines and/or motors, must adapt to different speed requirements and road conditions, a transmission is located between the prime mover and a set of wheels to adjust the output of the prime mover in order to move the vehicle at different speeds. The transmission includes an input shaft, operatively connected to an output shaft of the prime mover, and an output shaft, operatively connected to a drivetrain connected to the wheels. Transmissions, however, are not limited to applications involving powered vehicles, but are also used in human propelled vehicles, such as a bicycle, and in industrial machinery used in factories as well as in field operations, for instance at oil drilling operations.

The transmission is a system configured to transmit power and torque from the prime mover to the drive train. In one type of conventional transmission, the transmission includes a variety of gears, shafts, and clutches configured to transmit torque through the transmission at finite, stepped gear ratios. In another type of transmission, a continuously variable transmission (CVT) is configured to continuously vary the ratio of an input rotational speed to an output rotational speed under control of a vehicle operator, typically by a speed controller input such as provided by an accelerator.

In one type of CVT, a plurality of planets is disposed between an input disc and an output disc to vary the ratio of an input speed of the input disc to an output speed of the output disc. Each of the planets is supported for rotation about a central axis, wherein the angle of the central axis is configured to be adjustable to thereby vary the ratio of the input speed to the output speed. The rotary input disc and the rotary output disc are configured to steplessly or continuously vary the ratio of the input speed to the output speed in response to the orientation of the planets.

Continuously variable transmissions are known to include complex components manufactured from expensive materials. Because the cost of a CVT can be expensive due to the complexity and material composition of the components, it is desirable to create simpler designs that can be manufactured from a plurality of materials to reduce the overall cost of the components. In addition, by reducing the complexity of the components, repair costs can be reduced. Likewise, the number of component failures can also be reduced including those resulting from the incorrect assembly of components. What is needed, therefore, is a CVT having an improved manufacturability, improved reliability, reduced cost and more cost effective maintenance.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 1b is an enlarged partial view of FIG. 1a;

FIG. 4a, is an elevated perspective view of a clip of the present disclosure;

FIG. 4b is a right-side view of the clip from FIG. 4a;

FIG. 4c is a top-side view of the clip of FIG. 4a;

FIG. 5 is a partial lowered perspective view of the clip coupled to the movable stator;

FIG. 6 is a partial elevated perspective view of the clip coupled to the movable stator of FIG. 5;

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

The terminology used herein is for the purpose of describing particular illustrative embodiments only and is not intended to be limiting. As used herein, the singular forms "a", "an" and the may be intended to include the plural forms as well, unless the context clearly indicates otherwise. Similarly, plural forms may have been used to describe particular illustrative embodiments when singular forms would be applicable as well. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Figure 1A:
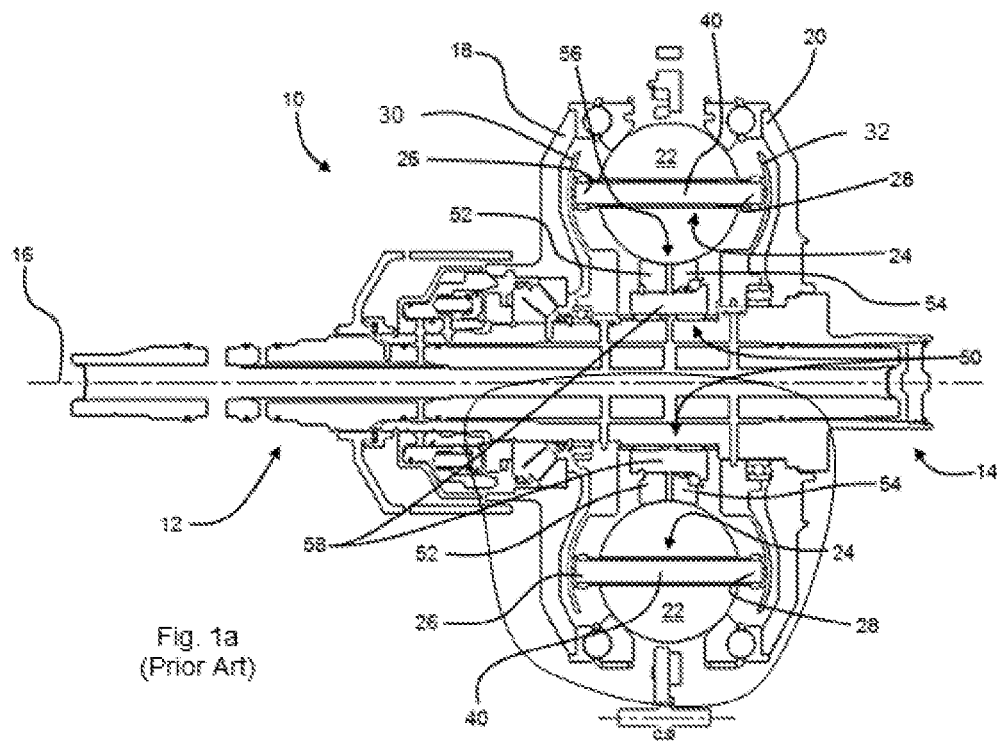
FIG. 1a is a sectional view of a portion of a continuously variable planetary (CVP) transmission assembly of the prior art.

FIG. 1a illustrates an elevational sectional view of a continuously variable planetary (CVP) transmission assembly 10 of the prior art, including an input shaft 12 and an output shaft 14. In one embodiment, the input shaft 12 is operatively connected to a drive shaft of a prime mover (not shown) and the output shaft 14 is operatively connected to an input shaft of a drive train (not shown). As can be seen in the illustrated embodiment, the assembly 10 is characterized by its symmetrical configuration about an axis 16. An input disc 18 is operatively connected to the input shaft 12 and is circumferentially located about the axis 16. An input received at the input shaft 12 rotates the input disc 18 about the axis 16. An output disc 20 is operatively connected to the output shaft 14 and is also circumferentially located about the axis 16. The output disc 20 rotates about the axis 16 in response to the rotation of the input disc 18 and further drives the output shaft 14.

The rotational speed of the output disc 20 depends on the rotational speed of the input disc 18 and the axial alignment of at least one planet 22, two of which are illustrated. Each of the planets 22 is rotationally supported by a spindle assembly 24 which extends through a central axis of the planet via a spindle 40 and which is supported respectively at ends 26 and 28 thereof by a movable stator 30 and a fixed stator 32. The stators 30 and 32 are circumferentially located about the axis 16. The assembly 10, in one embodiment, includes eight (8) planets 22 equally spaced about the axis 16. In other embodiments, the number of planets 22 varies. The volume or space defined between each of the input disc 18 and the output disc 20 may at least partially contain a fluid, such as lubricating oil, and the components located therebetween are lubricated by the fluid, as is understood by those skilled in the art.

Figure 1B:
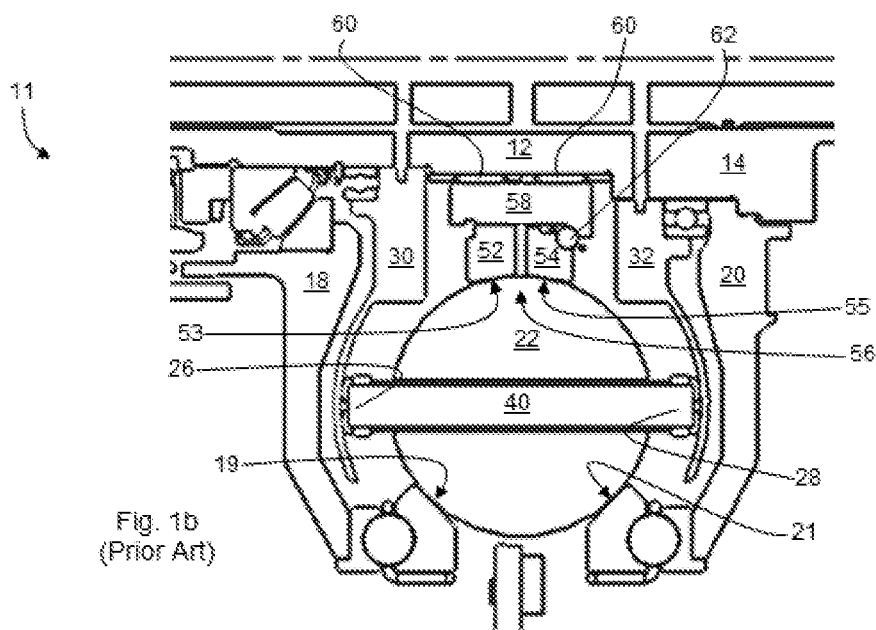

The planets 22 may be held in a particular axial alignment with the axis 16 in part by an idler assembly 50. The idler assembly 50 may have a first ring 52 and a second ring 54 rotatably coupled about the input shaft 12. The first and second ring 52, 54 may be disposed next to one another to define a substantially V-shaped cross section 56. The first ring 52 may be coupled to a base portion 58 as shown in the partial section view 11 in FIG. 1b. The base portion 58 may have a radially inner surface that is separated from the input shaft 12 by one or more bearings 60. Further, the second ring 54 may be rotationally coupled to the base portion 58 by a bearing 62. In this configuration, the first ring 52 may rotate independently from the second ring 54.

The radially innermost portion of the planets 22 relative to the axis 16 may be disposed within a portion of the V-shaped cross section 56. The input disc 18 may contact the planets 22 at a first location 19 while the output disc 20 may contact the planets 22 at a second location 21. The first and second location 19, 21 may substantially restrict the planets 22 from any movement radially away from the axis 16. Similarly, the first and second ring 52, 54 may contact the planets 22 at a third location 53 and a fourth location 55. By contacting the third and fourth locations 53, 55, the planets 22 may be substantially restricted from moving radially inward relative to the axis 16. That is to say, the planets 22 are held in a particular radial alignment relative to the axis 16 by a combination of contact with the first, second, third, and fourth locations 19, 21, 53, 55.

The planets 22 are also free to rotate about the spindle 40. As one skilled in the relevant art will understand, the input disc 18 may transmit a rotational force to the planet 22 through the first location 19. The planet 22 may rotate accordingly about the spindle 40. As the planet 22 rotates, the idler assembly 50 may freely rotate about the bearings 60, 62 because of the contact with the planet 22 at the third and fourth locations 53, 55. Finally the rotation of the planet 22 may be transferred to the output disc 20 at the second location 21.

As is known in the field of this disclosure, the fixed stator 32 may control the position of the first end 28 of the spindle 40 while the moveable stator 30 may control the position of the second end 26 of the spindle 40. The movable stator 30 may rotate about the axis 16 to alter the axial alignment of the spindle 40 with the axis 16. As the angle of the spindle 40 relative to the axis 16 is changed, the rotational speed of the input disc 18 relative to the output disc 20 may be altered. Similarly, the rotational speed of the first ring 52 relative to the second ring 54 may also change.

The CVP transmission assembly 10 of the prior art may couple the input disc 18 to the input shaft 12. Further, the base portion 58 of the idler assembly 50 may be coupled to the input shaft 12 through bearings 60. In one example of this configuration, the input shaft 12 may rotate in a clockwise direction. The input disc 18 may also rotate in a clockwise direction because the input disc 18 is coupled to the input shaft 12. As the input disc 18 rotates the planet 22 as described above, the idler assembly 50 is forced to rotate in a counterclockwise direction because of the contact with the planet 22 at the third and fourth locations 53, 55. This embodiment may not be ideal because the bearings 60 need to be sufficiently designed to accommodate the counter-rotating speed between the idler assembly 50 and the input shaft 12. One having skill in the relevant art will understand that reducing the rotational speed of a bearing is one way to increase the bearing's life-cycle.

Figure 2:
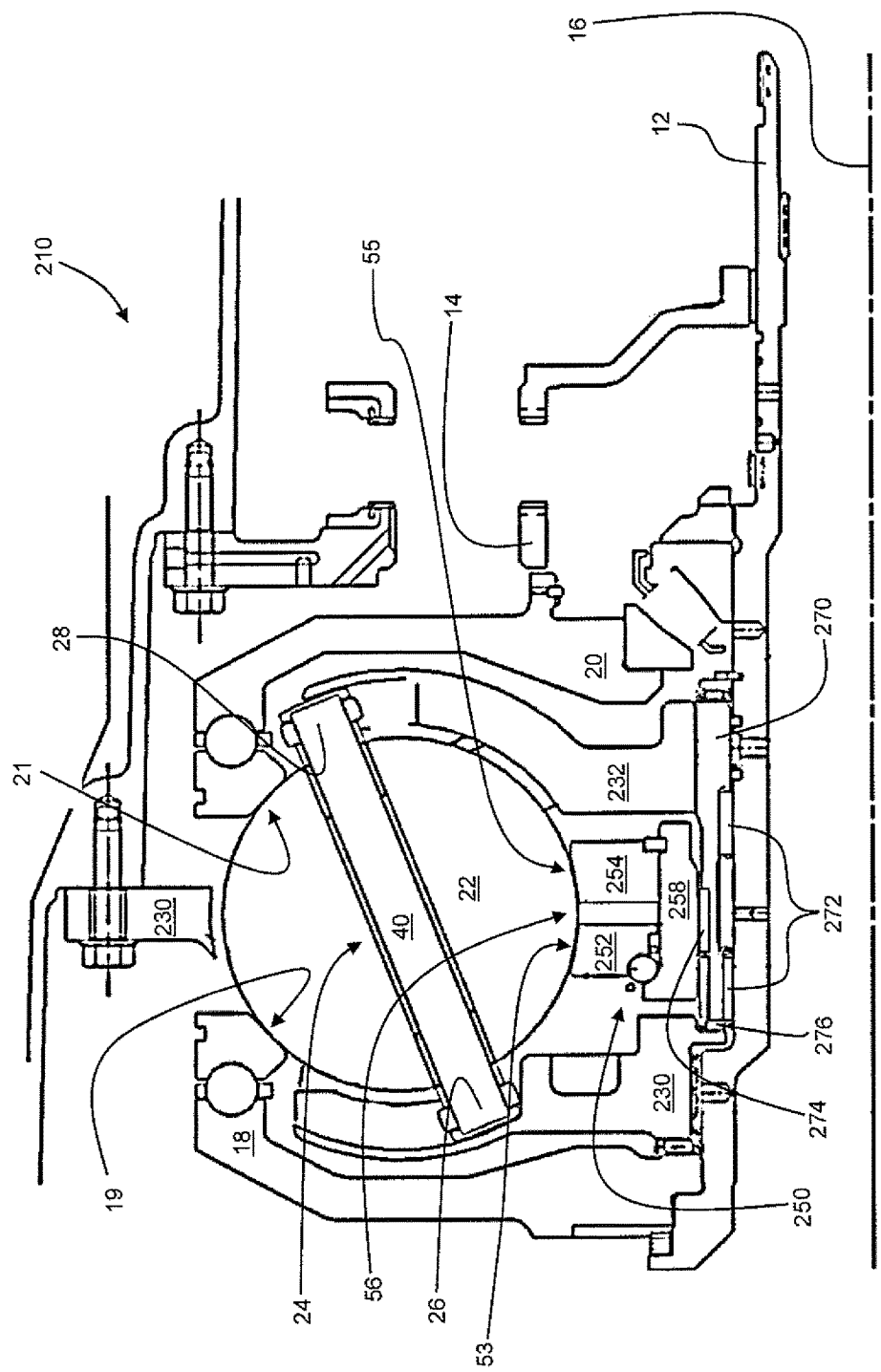
FIG. 2 is a sectional view of a CVP transmission of the present disclosure.

One aspect of the present disclosure is shown in the sectional view of a portion of the CVP transmission assembly 210 of FIG. 2. This nonexclusive embodiment of the CVP transmission assembly 210 may have a movable stator 232 that is coupled to a sleeve 270 at a radially inner portion of the movable stator 232. The sleeve 270 may be concentric with the input shaft 12 and extend axially away from the movable stator 232 towards a fixed stator 230. The sleeve 270 may end at a terminus 302 (FIG. 3a) of the sleeve 270 located near the fixed stator 230. In other embodiments, the sleeve 270 may not reach the fixed stator 230 before axially terminating. In yet another embodiment, the sleeve may pass through a radially inner portion of the fixed stator 230 before terminating.

Figure 7:
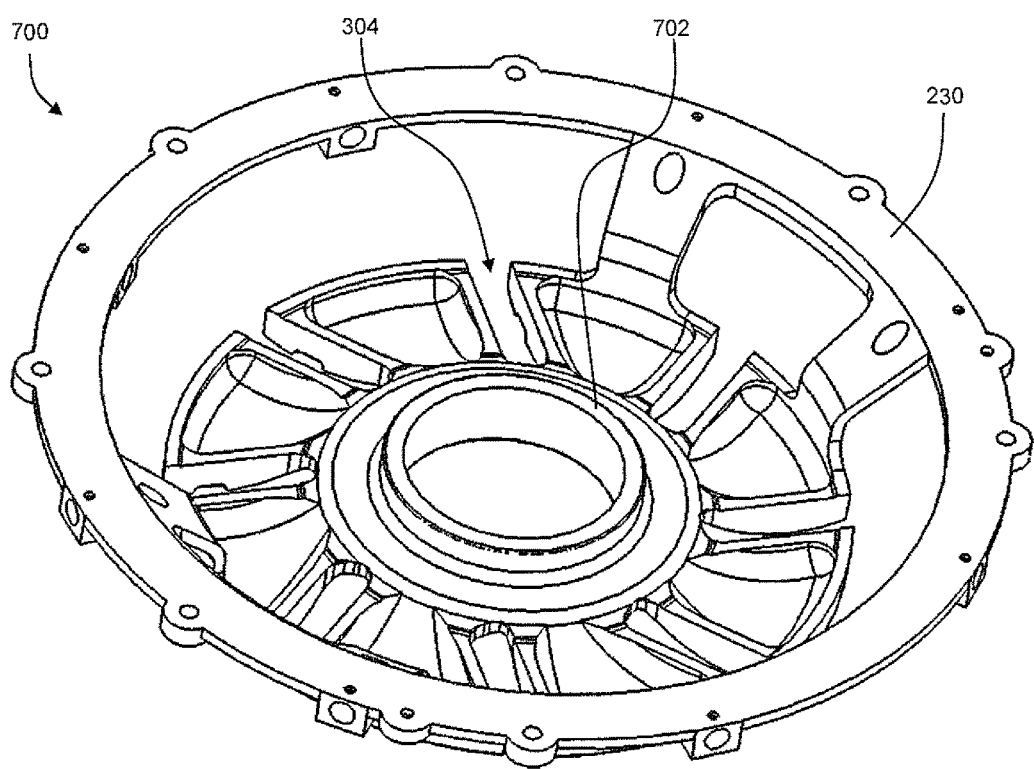
FIG. 7 is an elevated perspective view of a fixed stator of the present disclosure.

In one embodiment, a bearing 276 may be radially disposed between the terminus 302 (FIG. 3a) of the sleeve 270 and a terminus of the fixed stator 702 (FIG. 7). The sleeve bearing 276 may be of the thrust bearing type and may reduce the drag between the movable stator 232 and the fixed stator 230 as the movable stator 232 rotates radially relative to the fixed stator 230. Further, the sleeve 270 may have an inner diameter large enough to allow the input shaft 12 to be disposed therethrough and an outer diameter small enough to simultaneously allow an idler assembly 250 to be disposed therearound.

Figure 3A:
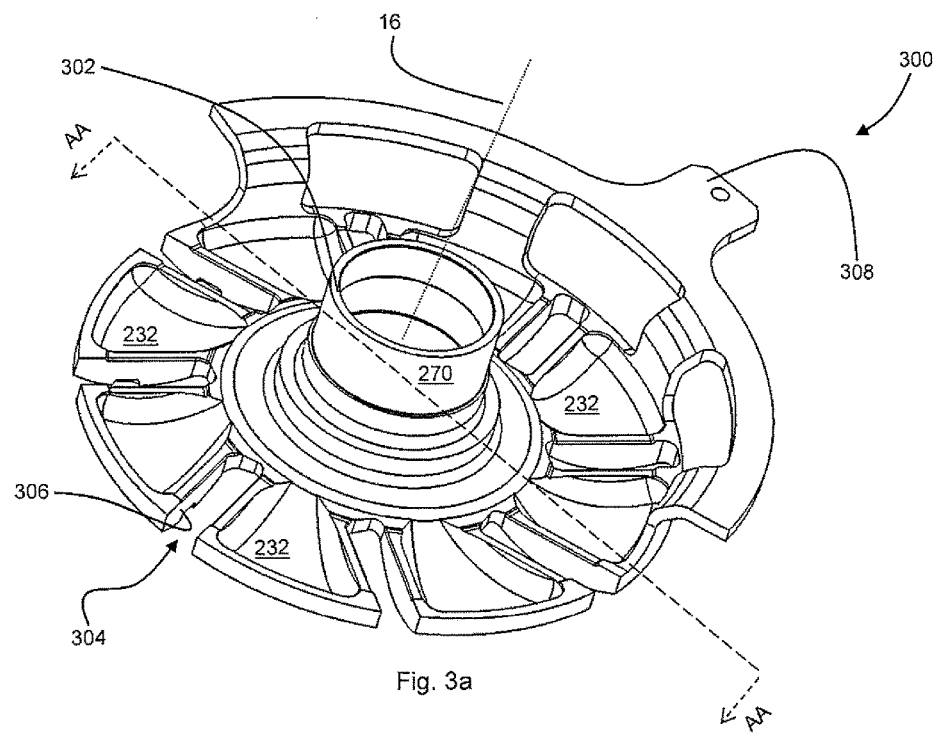
FIG. 3a is an elevated perspective view of a movable stator from FIG. 2.
Figure 3B:
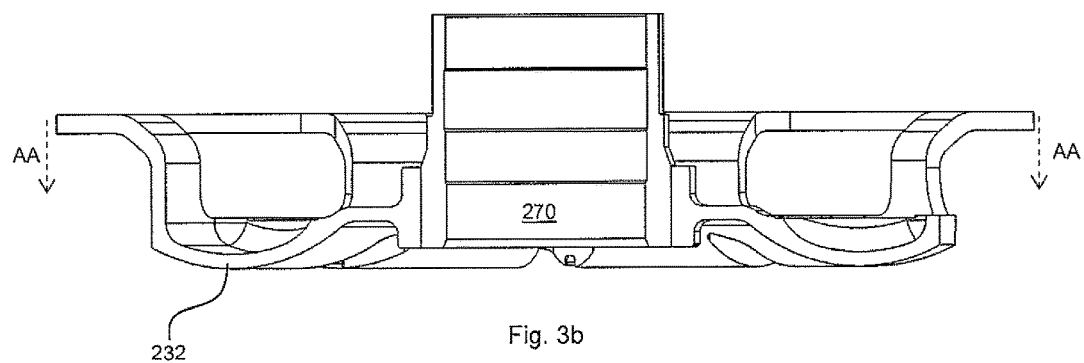
FIG. 3b is a cross-sectional view of the movable stator from FIG. 3a along the AA axis.

The sleeve 270, more clearly shown in FIGS. 3a and 3b, may be manufactured from a substantially different material than the movable stator 232. In one nonlimiting embodiment, the movable stator 232 may be manufactured of an aluminum material while the sleeve 270 may be manufactured of a steel material. Further, the sleeve 270 may be press fit, braised, welded, or otherwise coupled to the movable stator 232. One skilled in the relevant art will understand the advantages of manufacturing certain elements out of a less expensive material. In one nonexclusive embodiment, it may be advantageous to manufacture the movable stator 232 out of a less expensive material than the sleeve 270 because the movable stator 232 does not experience the same forces as the sleeve 270.

The material properties and dimensions of the sleeve 270 may allow the sleeve 270 to receive at least a first bearing 272 between the sleeve 270 and the input shaft 12. The first bearing 272 may be of the needle bearing type and allow the input shaft 12 to rotate independently from the sleeve 270. Additionally, the material properties and dimensions of the sleeve 270 may allow the sleeve 270 to receive at least a second bearing 274 of the needle bearing type between the sleeve 270 and a base 258 of the idler assembly 250. The second bearing 274 may allow the base 258, and in turn a first and second ring 252, 254, to rotate independently from the sleeve 270.

While needle bearings and thrust bearings have been described herein, one skilled in the art will recognize that many types of bearing can be implemented without leaving the teachings of this disclosure. More specifically, ball bearings, journal bearings, tapered roller bearings and the like may be implemented into the many different bearing locations of the present disclosure and such bearing types are also considered herein.

The movable stator 232 is typically restricted to minimal radial movement relative to the axis 16 as is known in the art. More specifically, the movable stator 232 may move radially about the axis 16 to change the angle of the spindle assembly 24 and thus the rotational speed of the output shaft 14 relative to the input shaft 12. However, as is known in the art, the movable stator 232 may only rotate about between 5-45 degrees. This rotation of the movable stator 232 may be controlled by an actuator (not shown) connecting a tab 308 (FIG. 3a) of the movable stator 232 to the CVP transmission housing (not shown). That is to say, the movable stator 232 is substantially restricted from rotating freely about the axis 16. The sleeve 270 may be similarly restricted from substantial radial movement through its coupled disposition with the movable stator 232.

As is known in the art, the actuator may introduce various stresses in the movable stator 232 as it is rotated by the actuator. In one embodiment, the first bearing 272 may substantially account for these stresses by allowing the sleeve 270 to rotate on the first bearing 272 as the actuator rotates the movable stator 232. In this embodiment, the stresses input by the actuator are transferred through the first bearing 272 to allow the movable stator to rotate.

In one nonexclusive embodiment, the addition of the sleeve 270 may create a rotational discontinuity between the base 258 and the input shaft 12. As described above for the prior art shown in FIGS. 1a and 1b, the input shaft 12 and the base 58 typically rotate in different directions about the axis 16. The prior art implements bearings 60 to separate the input shaft 12 and the base 58. As a result, the bearings 60 are exposed to the high rotational speeds of the counter-rotating input shaft 12 and base 58. By implementing the sleeve 270 shown in FIG. 2, the first bearing 272 experiences the rotational speeds of the input shaft 12 relative to the rotationally grounded sleeve 270. Similarly, the second bearing 274 experiences the rotational speeds of the base 258 relative to the rotationally grounded sleeve 270. In one nonlimiting example, the sleeve 270 can reduce the expected rotational speed of the bearings by avoiding directly coupling counter-rotating components.

An elevated perspective view 300 of the movable stator 232 is shown in FIG. 3a. The movable stator 232 may have at least one slot 304 disposed radially about the axis 16. The slot 304 may be sized to receive a clip 402 (FIGS. 4a-4c) therein. The slot 304 may be angularly offset within the movable stator 232 as is known in the art. More specifically, a person having skill in the relevant art will understand how the angular orientation of the slot 304 may affect the angular orientation of the spindle 40 relative to the axis 16. In turn, the angular orientation of the slot 304 may affect the speed at which the CVP transmission can transition between the various input to output ratios.

In one aspect of the present embodiment, the portion of the movable stator 232 surrounding the slot 304 may be manufactured of an aluminum material. In this embodiment, the aluminum material may be too soft to adequately react to the expected contact stresses that the ends 26, 28 of the spindle 40 may exert on an interior wall 306 of the slot 304. In part to address these contact stresses, the clip 402 may be placed within the slot 304. The clip 402 may be composed of a stronger material such as steel. The clip 402 may become substantially disposed within the slot 304 so that the ends 26, 28 substantially contact portions of the clip 402 as opposed to the interior wall 306.

An isolated and elevated view 400 of the clip 402 is shown in FIG. 4a. The clip 402 may have a first side wall 404, a second side wall 406, an end wall 408, and a top portion 410. The first side wall 404 can be oriented such that it will become parallel to the interior wall 306 when the clip 402 is coupled to the slot 304. Similarly, the second side wall 406 may be parallel to the first side wall 404 when the clip 402 is coupled to the slot 304. The first and second side wall 404, 406 may be separated from one another by the end wall 408. The end wall 408 may be substantially perpendicular to both the first and second side wall 404, 406 when the clip 402 is coupled to the slot 304. The top portion 410 may be a substantially 90 degree bend along an arc-shaped portion 407 of the second wall 406. Further, the top portion 410 may provide for a gap 411 between the top portion 410 and the end wall 408. In one embodiment, the top portion 410 may prevent the shaft 40 from substantial axial movement away from the planet 22.

The first side wall 404 may also form a first tab 412. The first tab 412 may be a substantially 90 degree bend about a portion of the first side wall 404 that is substantially opposite of the top portion 410. The first tab 412 may also extend away from the second side wall 406 and extend along a substantial portion of the length of the first side wall 404. The first tab 412 may also have a first tab surface 422 that is a substantially planar surface oriented towards the top portion 410.

An alignment tab 414 may also be located along an edge of the first side wall 404 that is opposite of the first tab 412. The alignment tab 414 may also be a substantially 90 degree bend in the first side wall 404. The alignment tab 414 may only be formed along a minimal portion of the edge of the first side wall 404. In one embodiment, the alignment tab 414 occupies less than half of the length of the edge. In yet another embodiment the alignment tab 414 occupies more than half of the length of the edge.

The second side wall 406 may also have a second tab 416 that is a substantially 90 degree bend in a portion of the second side wall 406. The second tab 416 may be along an edge of the second side wall that is opposite the arc-shaped portion 407. The second tab 416 may extend away from the first side wall 404 along a majority portion of the edge of the second side wall 406. The second tab 416 may define a second tab surface 424. The second tab surface 424 may be a substantially planar surface oriented in a direction towards the top portion 410.

One aspect of the clip 402 is the ability of the clip 402 to elastically deform sufficiently to be placed within the slot 304 of the movable stator 232. One way this may be achieved is by creating a wedge-shaped gap 418 between the top portion 410 and the first side wall 404. One nonexclusive benefit of the wedge-shaped gap 418 is the ability of the alignment tab 414 to deflect in an inward direction 420 towards the second side wall 406 sufficiently to allow the alignment tab 414 to become disposed within the slot 304.

Referring now to FIG. 5, the clip 402 is shown in the coupled position within the slot 304 of the movable stator 232. In the inside perspective view of the clip 402 in the coupled position 500, the clip 402 is substantially restricted from moving independently from the movable stator 232. More specifically, the first and second tab 412, 416 can become substantially aligned with a first surface 502 of the movable stator 232. The first and second tab surfaces 422, 424, may contact the first surface 502 and substantially restrict the clip 402 from moving in a first direction 504.

An outside perspective view of the clip 402 in the coupled position 600 is shown in FIG. 6. More particularly, the relationship of the alignment tab 414 with an indentation 602 of the movable stator 232 is shown. As described in part above, the first side wall 404 can be deflected in the inward direction 420 an adequate distance to allow the clip 402 to become disposed within the slot 304. In one embodiment, a force may be applied to cause deflection in the inward direction 420 that is adequate to allow the alignment tab 414 to avoid substantial contact with the interior wall 306 while the clip 402 is being slid into place. After the clip 402 is correctly aligned with the slot 304, the force causing deflection in the inward direction 420 may be released, and the alignment tab 414 may become disposed within the indentation 602.

Once the alignment tab 414 is disposed at least partially within the indentation 602, the clip 402 may be substantially constrained from movement relative to the movable stator 232. More specifically, a bottom surface (not shown) of the alignment tab 414 may contact a top surface (not shown) of the indentation 602 to substantially keep the clip 402 from moving in a second direction 604. Further, the edges of the alignment tab 414 may be substantially encompassed by a wall 608 of the indentation 602. The edges of the alignment tab 414 may align with the wall 608 so that any movement of the alignment tab 414 in a third direction 606 is also substantially restricted by contact between the wall 608 and the edges of the alignment tab 414.

In one nonexclusive embodiment, the clip 402 may be manufactured from a material having elastic material properties such as, but not limited to, spring steel. The material may be elastic enough to substantially hold the alignment tab 414 within the indentation 602 when no external forces are causing deflection in the inward direction 420. In the embodiment shown in FIGS. 5 and 6, the clip 402 may be substantially constrained from any movement independent from the movable stator 232 in part because of the elastic material characteristics of the clip 402.

The clip 402 may also be removed from the slot 304 using a similar process as described for inserting the clip 402 into the slot 304. For example, in one embodiment a user may apply a force to the alignment tab 414 in the inward direction 420 when the clip 402 is installed in the slot 304. The first side wall 404 may deflect sufficiently in the inward direction 420 to allow the alignment tab 414 become disposed substantially outside of the indentation 602. The clip 402 may then be slid out of the slot 304.

One having skill in the relevant art will understand the many ways the first side wall 404 can be deflected in the inward direction 420 when the clip 402 is coupled to the movable stator 232. In one nonexclusive embodiment, a flathead screwdriver may be positioned between the first side wall 404 or the alignment tab 414. The flathead screwdriver may then be rotated to cause the necessary deflection in the inward direction 420. Additionally, there may be a tab portion (not shown) along the first side wall 404 that may extend past the movable stator 232 so that a user may use their fingers to adequately deflect the first side wall 404 in the inward direction 420.

As described above in part, the clip 402 may be manufactured of a sufficiently strong material to allow the first and second side wall 404, 406 to adequately withstand the forces produced by the ends 26, 28 of the spindle 40. For example, the side walls 404, 406 may substantially cover the portions of the movable stator 232 that may contact the ends 26, 28. In this configuration, the stresses from the ends 26, 28 must be distributed through the side walls 404, 406 of the clip 402 prior to being distributed to the movable stator 232.

The clip 402 may also be easily replaceable within the respective slot 304. In one embodiment, the clip 402 may wear over the life cycle of the CVP transmission. In this embodiment, the worn clip 402 may be easily replaced without requiring the entire movable stator 232 to be replaced. The benefits of this repair process, among others, will be readily understood by a person having skill in the relevant art.

Referring now to FIG. 7, an elevated view 700 of the fixed stator 230 is shown. One having skill in the relevant art will understand how the fixed stator 230 functions in a substantially similar way as the movable stator 232 except for it may be fixedly coupled to the CVP transmission housing (not shown). More specifically, the angular orientation of the spindle 40 may be altered as the movable stator 232 rotates radially relative to the fixed stator 230. As the movable stator 232 rotates radially relative to the fixed stator 230, the location of the ends 26, 28 in the slots 304 (of both the fixed stator 230 and the movable stator 232) may change. As the location of the ends 26, 28 change within the slots 304, the angular orientation of the spindle 40 may also change.

As mentioned above, the fixed stator 230 may also have slots 304 designed to receive the clip 402. The slot 304 and clip 402 of the fixed stator 230 may function in substantially the same way as the slot 304 and the clip 402 function in the movable stator 232. Accordingly, the descriptions and embodiments described above for the clip 402 and slot 304 will not be repeated here. The embodiments describing the slot 304 and the clip 402 in the movable stator 232 should be considered equally applicable to the fixed stator 230 and incorporated herein.

While one embodiment may have the sleeve 270 coupled to the movable stator 232, one skilled in the relevant art will understand how the sleeve 270 can be coupled to the fixed stator 230 instead. In that embodiment, the sleeve 270 may extend from a radially inner portion of the fixed stator 230. The sleeve 270 can interact in substantially the same way with the input shaft 12 and idler assembly 250 as described above. Further, the sleeve bearing 276 can separate the sleeve terminus 302 from a terminus of the movable stator (not shown). Accordingly, this disclosure considers embodiments where the sleeve 270 can be coupled to either the fixed stator 230 or the movable stator 232.

Further, both the fixed stator 230 and the movable stator 232 may have a sleeve that extends half the distance separating the fixed stator 230 from the movable stator 232. In this embodiment, the sleeve bearing 276 may be located at a substantially midway point between the fixed stator 230 and the movable stator 232. Additionally, all potential sleeve lengths between the described embodiments are also considered herein.

Figure 8:
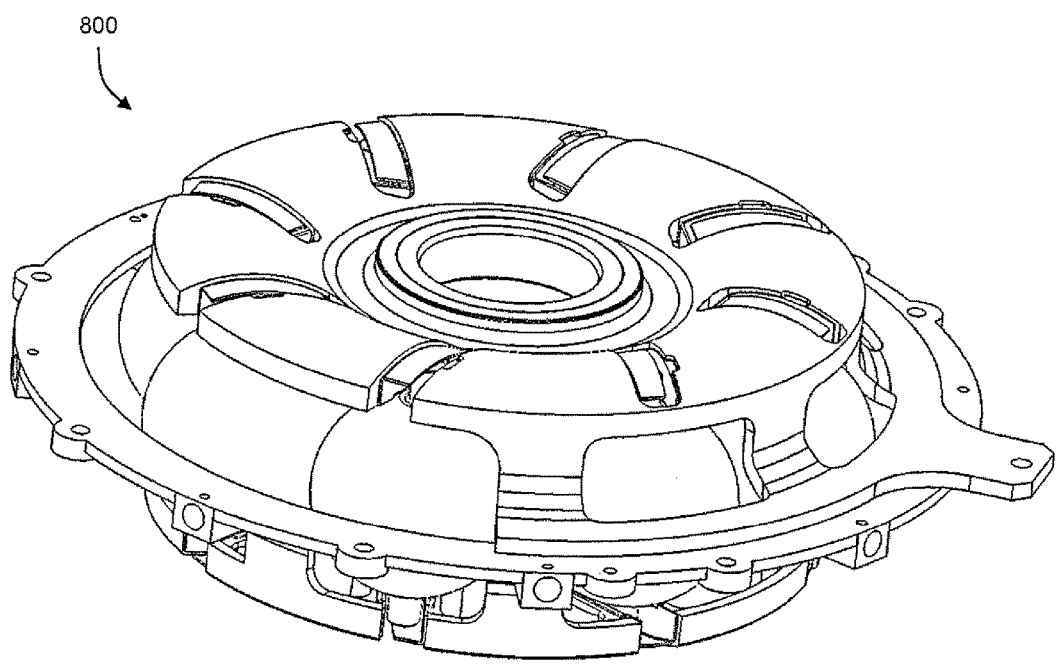
FIG. 8 is a elevational perspective view of components of a CVP transmission assembly of the present disclosure.

An elevated assembly view 800 is shown in FIG. 8. The fixed stator 230 and the movable stator 232 are shown coupled to one another with the planets 22 and clips 402 disposed therein.

Figure 9:
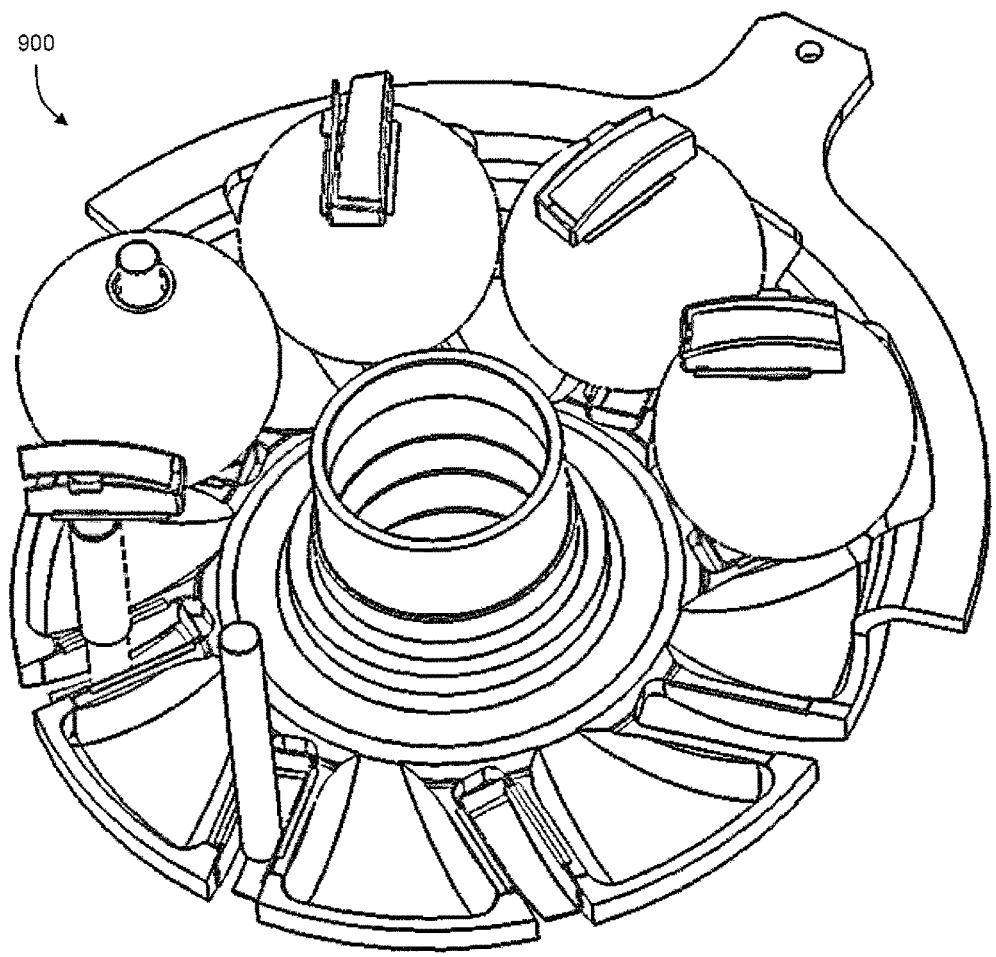
FIG. 9 is an elevated perspective view of the CVP transmission of FIG. 8 with some structure removed.

An elevated partial assembly view 900 is shown in FIG. 9. The fixed stator 230 and different elements of each of the planet assemblies are removed to more clearly illustrate present disclosure.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

We claim:

1. A continuously variable planetary (CVP) transmission, comprising:
   a movable stator radially disposed about an axis, the movable stator having at least a first slot;
   a clip removably coupled to the first slot, the clip defining a channel; and
   a planet spindle defining a first end, the first end being disposed within the channel of the clip.

2. The CVP transmission of claim 1, wherein the movable stator is formed from a first material and the clip is formed from a second material.

3. The CVP transmission of claim 2, further comprising:
   a sleeve coupled to a radially inner portion of the movable stator, the sleeve being radially disposed about the axis;
   wherein the sleeve is made of a third material.

4. The CVP transmission of claim 3, wherein the third material, has a substantially similar material composition as the second material.

5. The CVP transmission of claim 2, wherein the second material is a spring steel.

6. The CVP transmission of claim 1, further comprising:
   a fixed stator radially disposed about the axis, the fixed stator having at least a second slot capable of receiving the clip;
   wherein, the fixed stator is made of a first material; and
   wherein, when the clip is coupled to the second slot, the clip can receive a second end of the spindle to partially control an angle of the spindle relative to the axis.

7. The CVP transmission of claim 1, wherein the clip has a tab that becomes at least partially disposed within an indentation of the movable stator when the clip is coupled to the first slot.

8. A Continuously Variable Planetary (CVP) transmission assembly, comprising:
   a movable stator radially disposed about an input shaft;
   a fixed stator radially disposed about the input shaft, the fixed stator defining a face extending radially from an inner portion of the fixed stator;
   a sleeve coupled to the movable stator and extending axially along the input shaft towards the fixed stator, the sleeve ending at a terminus and having at least a first bearing between the sleeve and the input shaft.

9. The CVP transmission of claim 8, wherein the sleeve is rotatably coupled to the fixed stator.

10. The CVP transmission of claim 9, wherein a second bearing is located between the terminus of the sleeve and the face of the fixed stator.

11. The CVP transmission of claim 10, wherein the second bearing is a thrust bearing.

12. The CVP transmission of claim 10, wherein the sleeve defines a second lip configured to orient the second bearing at a particular axial location along the sleeve.

13. The CVP transmission of claim 8, further comprising:
   an idler assembly having a base, a first ring, and a second ring;
   wherein the base is rotatably coupled to the sleeve through a third bearing.

14. The CVP transmission of claim 13, wherein the third bearing is a needle bearing.

15. The CVP transmission of claim 13, wherein the third bearing includes more than one bearing.

16. The CVP transmission of claim 13, wherein the sleeve defines a first lip configured to orient the third bearing at a particular axial location along the sleeve.

17. A Continuously Variable Planetary (CVP) transmission, comprising:
   an input shaft defining an axis;
   a fixed stator radially disposed about the axis and coupled to a housing, the fixed stator defining at least one first slot;
   a movable stator radially disposed about the axis, the movable stator defining at least one second slot;
   at least one planet disposed between the fixed stator and the movable stator;
   a spindle defining an axis of rotation for the planet, the spindle having a first end and a second end;
   a sleeve coupled to the movable stator and extending axially towards the fixed stator, the sleeve being radially disposed about the input shaft;
   an idler assembly rotatably coupled to the sleeve; and
   a clip coupled to each of the first slot and the second slot, the clip configured to receive the first end or the second end of the spindle.

18. The CVP transmission of claim 17, wherein the fixed stator and the movable stator are formed from a material containing aluminum.

19. The CVP transmission of claim 17 wherein the clip and the sleeve are formed from a material containing a steel alloy.

20. The CVP transmission of claim 17, further comprising:
   a first bearing between the sleeve and the input shaft; and
   a second bearing between the sleeve and the idler assembly.

* * * * *